3,485,895
HIGH IMPACT POLYSTYRENE COMPOSITIONS CONTAINING ALKENYL ESTERS OF ALPHA-BRANCHED SATURATED CARBOXYLIC ACIDS

Gerardus E. La Heij, Jacques A. Waterman, and Adrianus D. Smout, Amsterdam, Netherlands, assignors to Shell Oil Company, New York, N.Y., a corporation of Delaware
No Drawing. Filed Jan. 20, 1967, Ser. No. 610,468
Int. Cl. C08f *19/06*
U.S. Cl. 260—880                                   3 Claims

ABSTRACT OF THE DISCLOSURE

Superior high-impact polystyrene and similar compositions characterized, i.e., by improved flexibility, are interpolymers, of (a) vinyl aromatics such as styrene, (b) elastomers such as rubber, SBR or polybutadiene and (c) certain ethylenically unsaturated carbonyloxy compounds, particularly alkenyl esters of Koch acids.

---

This invention relates to polyvinyl aromatic compositions having improved impact strength. More particularly, the invention relates to improved styrene-elastomer interpolymer compositions.

High impact polyvinyl aromatic compositions such as polystyrenes have become important materials in the preparation of plastic articles. Unlike unmodified polystyrene which is brittle or incapable of withstanding strain or impact, high impact polystyrene has impact strength and toughness which makes it useful for many products for which the brittle polystyrene would be unsuitable. The high impact polyvinyl aromatic compositions are copolymers or interpolymers of a vinyl aromatic such as styrene and an elastomer such as natural rubber, SBR rubber (butadiene-styrene copolymers), polybutadiene and the like. Although the presence of the elastomer in the polymer compositions greatly improves their strengths even greater impact resistance is desirable for many applications.

It has now been found according to the invention that improved impact resistant polyvinyl aromatic compositions also having greater flexibility are those containing certain unsaturated carbonyloxy compounds. More specifically, the useful carbonyloxy compounds are ethylenically unsaturated carboxylic acids and esters having the general formula:

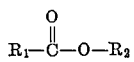

wherein $R_1$ and $R_2$ may be hydrogen or a hydrocarbyl radical having at least one olefinic double bond and wherein the total number of carbon atoms in the molecule is at least 9. At least one of the R groups is a hydrocarbyl radical. The preferred compounds contain at least one olefinic double bond which is not conjugated either with another olefinic double bond or with the double bond of the carbonyl group. Preferred compounds of this type are the unsaturated fatty carboxylic acids wherein $R_1$ is a hydrocarbyl radical

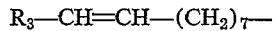

with $R_3$ representing hydrogen or a hydrocarbyl radical which may be substituted. Suitable acids include oleic acid, linoleic acid, linolenic acid and mixtures thereof. Another useful acid is undecylenic acid. Useful acids may have up to about 30 carbon atoms. The esters of the unsaturated carboxylic acids are preferably alkyl or alkenyl esters such as methyl, ethyl, isopropyl, butyl, vinyl, methyl vinyl, esters and the like. In addition, useful esters are the styrene soluble resins of the unsaturated fatty acids and an epoxy resin such as a polyglycidyl ether of a polyhydric phenol. These epoxy resins are well known to those skilled in the art. The esters may be partial or full esters. Useful esters are those of up to about 50 carbon atoms.

Another group of useful impact improving carbonyloxy compounds within the scope of the invention are the unsaturated esters of saturated carboxylic acids wherein the compounds contain at least 9 carbon atoms. Vinyl esters or methyl vinyl esters of saturated acids such as stearic, palmitic, myristic, lauric and caproic acids are useful.

However, especially preferred are the alkenyl esters of saturated monocarboxylic acids which acids are branched at the alpha position. These acids are commonly referred to as Koch acids in the art. The preferred acids are alpha, alpha-dialkyl saturated monocarboxylic acids of from 4 to 20 carbon atoms and especially 5 to 15 carbon atoms and having the formula:

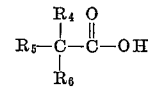

wherein $R_4$ and $R_5$ each represent the same or different alkyl radicals of normal, branched or cyclic structure and $R_6$ represents hydrogen or an alkyl radical. Examples of $R_4$, $R_5$ and $R_6$ are methyl, ethyl, propyl, butyl, pentyl, octyl, decyl, etc. Suitable acids are those prepared by the reaction of formic acid, or of carbon monoxide and water, with mono-olefins in the presence of liquid highly acidic inorganic catalysts, such as sulfuric acid, phosphoric acid, boron trifluoride and water, complexes of phosphoric acid, complexes of sulfuric acid, etc. such as described, for example, in U.S. 3,047,622, 3,059,004, 3,059,005, 3,059,006 and 3,059,007. The acids prepared by these methods are mixtures of alpha, alpha-dialkyl saturated monocarboxylic acids of the same number of carbon atoms and of the general formula set forth above. Very suitable acids are those prepared from monoolefinic hydrocarbons such as propylene, butylene-1, butylene-2, isobutylene, pentenes, hexenes, heptenes, octents, etc., and polymers and copolymers of alkenes such as di-isobutylene, propylene trimer, propylene tetramer, etc., under conditions as set forth in the above-mentioned patents. Such acids may also be prepared from mixtures of olefins obtained, for example, by cracking paraffins. The vinyl esters of the alpha-branched monocarboxylic acids may be prepared by known methods such as by reaction of the acid or acid mixture with vinyl acetate in the presence of a mercury salt or by the reaction of the acid with acetylene in the presence of metallic catalysts such as zinc, cadmium or mercury compounds. Such methods are known to those skilled in the art.

The amount of the carbonyloxy compound used in the polymer compositions may be between about 0.1 to 20% and preferably up to about 10% by weight based on the total composition.

The elastomer used in preparing the interpolymers may be a natural rubber or synthetic rubber such as butadiene-acrylonitrile copolymer, butadiene-styrene copolymer (SBR type) or polybutadiene. The butadiene-styrene copolymers may be random or block copolymers including the so-called tapered block copolymers. These copolymers are well known in the art. Preferred are the copolymers containing less than 30% by weight of styrene.

Polybutadienes are very desirable elastomers used in preparing high impact polystyrene compositions. The preferred polybutadienes are those having a microstructure wherein the 1,2 units are rather low and preferably below 15%. Such polymers are prepared by polymerizing the butadiene in the presence of lithium-based catalysts including metallic lithium or an organolithium compound such as butyl lithium or amyl lithium and the like. Other methods include polymerization in the presence of an organo-metallic compound wherein the metal is selected from Groups I–III of the Periodic Table and a metal salt wherein the metal is selected from Groups IV–VI and VIII. Examples of suitable organo-metallic compounds are aluminum, magnesium and zinc alkyls or alkyl aluminum halides. The Group VIII metal salts such as cobalt and nickel chlorides, bromides, nitrates and the like are also preferred.

In preparing the interpolymers of the invention, the elastomer is mixed with the vinyl aromatic monomer and carbonyloxy compound and polymerization is initiated. The polymerization may be in suspension or bulk. Polymerization is initiated by heat, catalysts such as peroxides or ionizing radiation. Good results are obtained by heating the reaction mixture to a temperature from about 80–200° C. or higher for a time sufficient to polymerize substantially all of the styrene. The addition of catalysts allows the use of lower temperatures.

Since the reaction is exothermic, it is desirable to stir or otherwise agitate the reaction mixture in order to provide for heat transfer and tempeature contol as well as improved product uniformity. However, shearing forces affect the particle size of the dispersed rubber particles. Thus, in order to maintain a balance of conditions, strong shear forces are preferably avoided while maintaining mixture uniformity and good heat transfer.

It is also desirable to polymerize in different temperature stages. Preferred products may be obtained by polymerizing at temperatures below about 120° C. until at least about 5% and up to about 40% of the styrene has polymerized followed by a post-polymerization at a higher temperature.

The polymerization mixture may also contain lubricants or other flow agents such as small amounts of mineral oils, vegetable oils, paraffin wax as well as antioxidants and the like. It may also be desirable to perform the polymerization and particularly the post-polymerization in the presence of a polymerization modifier such as iodine, t-butylcatechol, etc.

The following examples are provided to illustrate the manner in which the invention is carried out. Unless otherwise indicated parts and percents disclosed are given by weight.

EXAMPLES 1–11

Styrene-polybutadiene interpolymers were prepared as follows: a reaction mixture containing styrene, 6% rubber, 0.1% dilauryl peroxide catalyst were prepolymerized in a reactor under nitrogen for 4 hours without stirring. In Examples 3–11, a carbonyloxy compound was also added to the polymerization mixture as indicated in Table I. The polybutadiene rubber used in each example was obtained by polymerizing butadiene at 25° C. in the presence of $CoCl_2$-$AlCl_3$-benzene complex catalyst activated with $Al(C_2H_5)_2Cl$ and water. The rubber had a Hoekstra plasticity value of 41 as determined by the method disclosed in Rubber and Plastics Age, vol. 42, page 1072 (1961), at a loading time of 30 seconds. In the examples, the prepolymerization temperatures were 80° C. or 90° C. and post-polymerization temperatures were 180° C. for 20 or 24 hours as indicated in the table. At 80° C., the styrene prepolymerization conversions were about 22% and at 90° C. about 29%. The prepolymerization mixture was then transferred to a tin pla'e reactor provided with a reflux condenser and a nitrogen inlet. After purging the reactor with nitrogen, the polymerization mixture was heated to 180° C. and post-polymerized until the styrene was completely converted. The reactor was then cooled to room temperature and the polymerization product removed and processed into plates 7–8 mm. thick and platelets 1 mm. thick. The plates were used to make Izod impact test specimens while the platelets were used to measure tensile strength. The polymeric products were then tested and the properties set forth in Table I. The Izod impact resistance was determined at 0° C. and 20° C. according to 306–A, British Standard 2782, part III (1957), the tensile properties were measured at speed of 3 cm. per minute at 20° C. according to British Standard 903, part 15 (Dumbell C) and the melt index determined according to 105–C of British Standard 2782, part I (1956) using 4 g. of sample, 2.16 kg. load and a temperature of 200° C.

TABLE I

| Example | Carbonyloxy compound | Percent | Prepolymerization temp. °C. | Post-polymerization time, hours | Izod impact, kg. cm./cm.² 0° C. | Izod impact, kg. cm./cm.² 20° C. | Tensile strength, kg./cm.² | Yield stress, kg./cm.² | Elong., percent | Melt Index, g./10 min. |
|---|---|---|---|---|---|---|---|---|---|---|
| 1 | None | | 80 | 20 | 5.1 | 7.8 | | 300 | 20 | 0.8 |
| 2 | do | | 90 | 24 | 4.9 | 8.0 | 290 | 294 | 20 | 0.85 |
| 3 | Methyl acrylate | 2 | 90 | 24 | 4.9 | 7.9 | 290 | 306 | 20 | 0.9 |
| 4 | do | 6 | 90 | 24 | 5.1 | 6.2 | 300 | 310 | 35 | 0.8 |
| 5 | Stearic acid | 2 | 90 | 24 | 5.1 | 8.2 | 290 | 295 | 20 | 0.9 |
| 6 | Butyl stearate | 2 | 90 | 24 | 5.0 | 8.1 | 290 | 300 | 20 | 0.9 |
| 7 | Soybean oil | 2 | 90 | 24 | 6.1 | 9.5 | 296 | 300 | 30 | 1.0 |
| 8 | Vinyl stearate | 4 | 80 | 20 | 7.3 | 10.5 | 207 | 180 | 48 | 2.7 |
| 9 | Oleic acid | 4 | 80 | 20 | 8.6 | 12.4 | | 165 | 49 | |
| 10 | Vinyl ester of versatic 911 | 0.5 | 90 | 24 | 5.5 | 9.1 | 294 | 300 | | 1.0 |
| 11 | do | 2 | 80 | 20 | 10.0 | 14.9 | | 295 | 50 | |
| 12 | do | 6 | 90 | 24 | 8.6 | 12.4 | 195 | 200 | 50 | 1.9 |

NOTE.—Versatic 911 is a mixture of alpha, alpha-dialkyl saturated aliphatic carboxylic acids having 9–11 carbon atoms and prepared by reacting carbon monoxide and water with $C_8$–$C_{10}$ olefins in the presence of liquid acid catalysts.

EXAMPLE 13

Styrene-polybutadiene interpolymer compositions were prepared by the procedure set forth above using prepolymerization temperature of 80° C. for 4 hours and a post-polymerization temperature of 180° C. for 24 hours. Small amounts of carbonyloxy compounds were added as set forth in the Table II below. The post-polymerization was carried out in sealed glass tubes having an internal diameter of 9 mm. The final polymer was removed by carefully breaking the glass tubes and the polymer recovered in the form of round bars. The bars were then cut in 4 cm. long pieces. At the center of the bars a notch was made having a straight base line and a maximum depth of 1 mm. The impact resis'ance of the notched bars was tested by dropping a 200 gram weight, the lower part of which was cylindrically shaped with a diameter of 1 cm., onto the end of a test bar which was clamped horizontally between two metal plates. The bar was placed between the plates so that the notch faced upward and was just beyond the end of the upper plate. The distance between the end of the bottom plate and the vertical plane through the base line of the notch was 2 mm. The drop weight impact strength (DWIS) is the smallest height at which the test specimen failed. The heights of the fall were varied by 5 cm. The results are set forth in Table II below.

TABLE II

| Example | Carbonyloxy Compound | Percent | DWIS, cm. |
|---|---|---|---|
| 13 | None | | 25 |
| 14 | Ethyl acrylate | 4 | 30 |
| 15 | Ethylhexyl acrylate | 4 | 35 |
| 16 | Vinyl stearate | 4 | 45 |
| 17 | Oleic acid | 4 | 45 |
| 18 | Vinyl ester of Versatic 911 | 1 | 45 |

As is evident from the examples and the results thereof as set forth in the table above, the addition of the unsaturated carbonyloxy compounds of the invention to the styrene-rubber interpolymer compositions significantly increased the impact resistance of the compositions over resins containing no carbonyloxy compounds or those not within the scope of the invention. Thus, the improvement of the impact strength of the compositions of Examples 8–12 and 16–18 and especially those of the preferred carbonyloxy compounds of Examples 10–12 and 18 is shown.

We claim as our invention:

1. A high impact polymonovinyl aromatic hydrocarbon composition comprising an interpolymer of (1) from about 80 to about 98 parts by weight of a monovinyl aromatic hydrocarbon compound, (2) from about 2 to about 20 parts by weight of an elastomer selected from the group consisting of natural rubber, butadiene-styrene copolymers and polybutadiene and (3) about 0.1 to about 6% by weight of the total composition of an alkenyl ester of an alpha-branched saturated monocarboxylic acid having 5–15 carbon atoms wherein the total number of carbon atoms in the molecule is at least 9.

2. A composition as set forth in claim 1 wherein the elastomer is polybutadiene.

3. A composition as set forth in claim 1 wherein the ester is a vinyl ester of an alpha, alpha dialkyl saturated carboxylic acid having from 9 to 11 carbon atoms.

References Cited

UNITED STATES PATENTS

| 2,606,163 | 8/1952 | Morris et al. | 260—880 XR |
| 2,683,127 | 6/1954 | Griess | 260—880 XR |
| 3,400,175 | 9/1968 | Finestone et al. | 260—880 |
| 3,407,246 | 10/1968 | Harris | 260—880 |

MURRAY TILLMAN, Primary Examiner

K. E. KUFFNER, Assistant Examiner

U.S. Cl. X.R.

260—4, 23.7